July 7, 1942.    W. PETERSON    2,288,595
ARTIFICIAL LURE
Filed Jan. 2, 1941
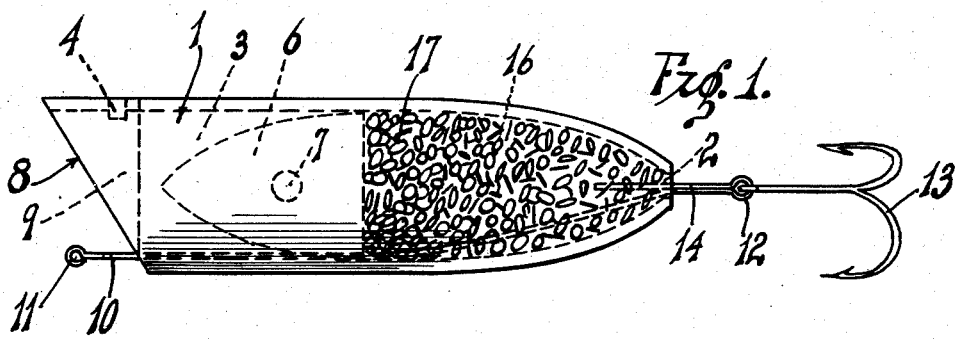
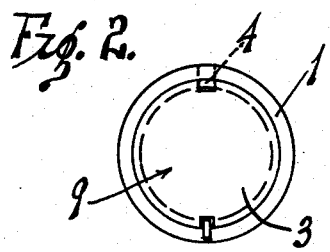
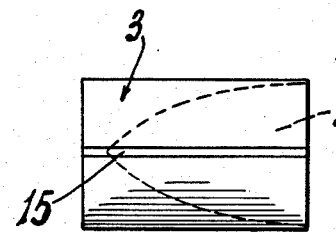
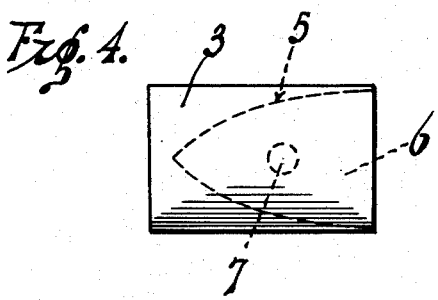
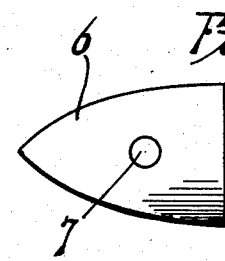
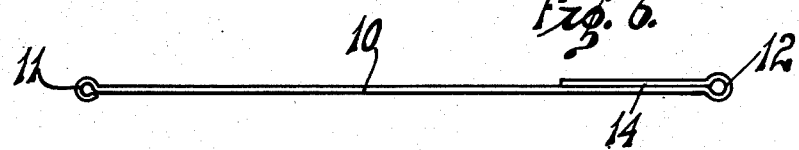
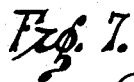
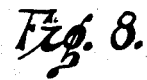
INVENTOR.
WALTER PETERSON.
BY
ATTORNEY.

Patented July 7, 1942

2,288,595

UNITED STATES PATENT OFFICE 2,288,595

ARTIFICIAL LURE

Walter Peterson, Long Beach, Calif.

Application January 2, 1941, Serial No. 372,786

5 Claims. (Cl. 43—46)

This invention relates to a novel artificial fishing lure, comprising a transparent body, so arranged and constructed as to provide a simple effective and inexpensive lure; and furthermore, one which is lifelike in its action, and is inexpensive to manufacture.

Another object of my invention is to provide a novel artificial fishing lure, which has a lifelike action in the water, and one in which the action of the lure can be altered to suit varying fishing requirements.

Still another object of my invention is to provide a novel artificial fishing lure, which is provided with a weight, the weight simulating the head of a minnow.

A feature of my invention resides in the novel arrangement of disks or loose plates within the body simulating the scales on a real minnow.

Other objects, advantages and features of invention appear from the accompanying drawing, the subjoined detailed description or the appended claims.

In the drawing:

Figure 1 is a side elevation of my artificial lure.

Figure 2 is an end view of the same.

Figure 3 is a side view of the plug.

Figure 4 is a side view of the plug with the weight inserted.

Figure 5 is a side elevation of the weight.

Figure 6 is a side elevation of the link.

Figure 7 is an elevation of one of the disks.

Figure 8 is an edge view of the same.

Referring more particularly to the drawing, the numeral 1 indicates the body of the lure, which is formed of a suitable transparent material such as plastic. The body is hollow, and is tapered substantially as shown. A small hole 2 is provided in the small end of the body, the purpose of which will be further described.

A plug 3 is fitted in the large end of the body, and this plug is also formed of a transparent material such as plastic or the like. The plug, as previously stated, is fitted in the large end of the body, and fits rather accurately in the body. However, this plug can be rotated in the body, if desired, for the purpose of varying the angle of pull on the lure, as will be further described.

A pin 4 extends through the wall of the body 1, in front of the plug 3, to prevent the plug from being accidentally pulled out of the body.

A tapered bore 5 is provided in the plug 3, and a weight 6 is first in this bore, the weight simulating the head of a minnow, and is provided with a colored eye 7 of suitable shape and size.

The weight 6 may be colored, if desired, or the inside of the bore 5 may be colored. In either event the appearance of a minnow head is provided, due to the fact that both the body 1 and the plug 3 are transparent.

The forward edge of the body 1 is cut at an angle, as shown at 8, thus providing a pocket 9 in which water is trapped as the lure is pulled through the water, and the water escaping at the bottom edge of the lure will cause the same to dart or move either from side to side or up and down, depending on the position of the pulling link.

A pulling link 10 extends through the lure body 1, and is provided with an eye 11 at the forward end, to which the line is attached. An eye 12 at the rear receives the hook 13. The link 11 passes through the hole 2, and the link is bent back upon itself as shown at 14, and this bent portion extends through the hole 2, thus preventing the eye 12 from opening, and thus preventing the loss of the hook.

The link 10 passes through a groove 15 in the bottom of the plug 3, thus enabling the plug to be rotated in the body when the link 10 is manually adjusted by the fisherman.

By angularly adjusting the drawing end of the link 10 in the body 1 the high point of the recess 9 can be adjusted relative to the drawing end of the link, which changes the character of the movement of the lure through the water.

A space 16 is provided within the body back of the plug 3, and this space is loosely filled with small disks 17, which are either metallic or may be plastic, or a material which is painted, and these disks float in the water which enters the body, and move somewhat, as the lure passes through the water, thus simulating the scales of a fish.

Since the body 1 and the plug 2 are transparent, they are not visible in the water, and the head or weight 6, and the disks 17, are the only parts which are visible, and these quite accurately simulate a small fish or minnow.

Having described my invention I claim:

1. An artificial lure comprising a hollow transparent body, a plug in one end of said body the other end of the body being open, a link extending longitudinally through the body, and a hook attached to one end of said link, and a plurality of freely movable disks in said body between the plug and one end of the body.

2. An artificial lure comprising a hollow transparent body, a plug in one end of said body, a link extending longitudinally through the body, and a hook attached to one end of said link, said plug being of a transparent material, and a weight positioned in the plug.

3. An artificial lure comprising a hollow transparent body, a plug in one end of said body the other end of the body being open, a link extending longitudinally through the body, and a hook attached to one end of said link, said plug being of a transparent material, and a weight positioned in the plug, and a plurality of freely movable disks in said body between the plug and one end of the body.

4. An artificial lure comprising a hollow transparent body, one end of said body being cut at an angle, a plug arranged in the body at the forward end thereof, said body having a recess between the plug and the forward end of the body, a link extending longitudinally through the body, and a hook attached to the rear end of the link, and a plurality of disks in the body, arranged between the plug and the rear end of the body, a weight simulating a fish's head, said weight being positioned in the plug.

5. An artificial lure comprising a hollow transparent body, one end of said body being cut at an angle, a plug arranged in the body at the forward end thereof, said body having a recess between the plug and the forward end of the body, a link extending longitudinally through the body, and a hook attached to the rear end of the link, and a plurality of freely movable disks in the body, arranged between the plug and the rear end of the body, a weight simulating a fish's head, said weight being positioned in the plug, said plug being formed of a transparent material.

WALTER PETERSON.